United States Patent [19]

Humlong

[11] 3,858,942
[45] Jan. 7, 1975

[54] HUB AND AXLE ASSEMBLY

[75] Inventor: Robert Frank Humlong, Maysville, Ky.

[73] Assignee: Wald Manufacturing Company, Incorporated, Maysville, Ky.

[22] Filed: Jan. 5, 1973

[21] Appl. No.: 321,464

[52] U.S. Cl. .............. 301/105 B, 151/22, 308/192
[51] Int. Cl. .......................................... B60b 27/00
[58] Field of Search..... 301/105 B, 105 R; 308/192; 10/1; 72/88; 151/22

[56] References Cited
UNITED STATES PATENTS

| 1,914,696 | 6/1933  | LeFever  | 151/22    |
| --------- | ------- | -------- | --------- |
| 2,135,637 | 11/1938 | Gade     | 151/22    |
| 2,484,644 | 10/1949 | Poupitch | 151/22    |
| 2,679,774 | 6/1954  | MacDonald| 151/22    |
| 3,131,008 | 4/1964  | Dian     | 301/105 B |
| 3,280,872 | 10/1966 | Neuschotz| 151/22    |
| 3,428,377 | 2/1969  | Christian| 308/192   |
| 3,479,675 | 11/1969 | Ricca    | 151/22    |

Primary Examiner—M. Henson Wood, Jr.
Assistant Examiner—Reinhard J. Eisenzopf
Attorney, Agent, or Firm—J. Warren Kinney, Jr.

[57] ABSTRACT

The axle of a bicycle wheel hub is formed with a screw thread to be engaged by the internal threads of a complementarily threaded bearing cone, and certain threads of the axle are modified in a particular manner to produce binding means highly effective for automatically and releasably locking the bearing cone at selected locations upon the axle, for the purpose of maintaining a reliable anti-friction bearing adjustment.

8 Claims, 6 Drawing Figures

PATENTED JAN 7 1975

3,858,942

HUB AND AXLE ASSEMBLY

BACKGROUND OF THE INVENTION

In the manufacture of bicycle hub and axle assemblies, common practice has been to factory-assemble upon the axle the hub, the necessary ball-bearing, and the cones, with the cones carefully pre-adjusted to the ball-bearings so that the entire assembly might be deemed ready for application to the bicycle frame fork, without further bearing adjustments. By means of this procedure, the recipient of the pre-adjusted assembly is assured of a proper and skilful bearing mounting that will perform maximal service, with little or no liklihood of bearing failures occuring. This of course is equally beneficial to the recipient, as well as to the supplier of the assembly who must usually guarantee its performance and durability.

Pre-adjusted hub and axle assemblies of the general character above referred to are disclosed in the U.S. Patents of Dian, U.S. Pat. No. 3,131,008, dated Apr. 28, 1964, and Christian, et al U.S. Pat. No. 3,428,377, dated Feb. 18, 1969. In both of these disclosures, the internal threads of the cone member are required to cut their own threads in a distinctly unthreaded portion of the axle, incident to the application and adjustment of said cone members.

It may be noted that the procedures of the prior art patents involve the use of hardened cone members, in order to ensure self-threading of the axle where no threads had theretofore been provided. The ball races of the cone members are hardened also, of necessity, and to an extent exceeding the hardness of the races in the formed hub.

SUMMARY OF THE INVENTION

In accordance with the present invention, the cone member is not required to cut threads initially into the steel of the axle, but instead, will act to restore threads previously formed and then deformed in the metal. In restoring the axle threads, the thread of the cone member actually reshapes the previously deformed axle thread to a fit which is precise, tight, and resilient within the limits of inherent resiliency of the axle metal. The thread fit so obtained is practically as well as technically perfect, with no clearances or looseness in evidence, and with maximal areas of binding contact at the faces, peaks, and roots of the thread. These virtues result in a threaded connection which accurately fixes and firmly maintains the cone at any predetermined or adjusted location upon the axle, subject, however, to subsequent re-adjustment or complete removal of the cone, without damage or depreciation of function of the axle or cone threads.

In practice, the opposite ends of the axle are provided with screw threads in any usual manner, such as by rolling. The length of each threaded portion extends uninterruptedly to or slightly beyond the expected final position or zone of repose of the cone upon the axle, in which position the cone is to embrace the wheel hub bearing balls with precise adjustment. During or subsequently to formation of the threads as stated, a deforming operation is imposed upon those threads which are within the final zone of repose of the cone. The deforming operation mashes of flattens and spreads the peaks of the axle threads lengthwise of the axle, without materially altering the thread depth or root diameter.

After deformation of the particular axle threads specified, the internally threaded cone or nut may be rotated freely onto the axle thread until it encounters the deformed threads and thereby meets with resistance to advancement. Further rotation of the cone causes its threads to follow the original spiral path of the axle threads located in the zone of deformation, this resulting in reforming of the axle threads by the cone threads, to a thread shape which approximates, yet differs from the original shape of the axle thread in that the reformed or restored thread enjoys a tighter and more perfect fit with the thread of the cone.

The procedure outlined above produces a firm threaded connection free of all looseness which could fault the bearing adjustment, and ensures against accidental rotation of the cone from its final position of adjustment and repose upon the axle. It is noteworthy also that the axle thread deformation referred to is performed at no additional expense, since it may readily be an operation performed concurrently with the thread rolling operation, utilizing a common die.

Figure 1:
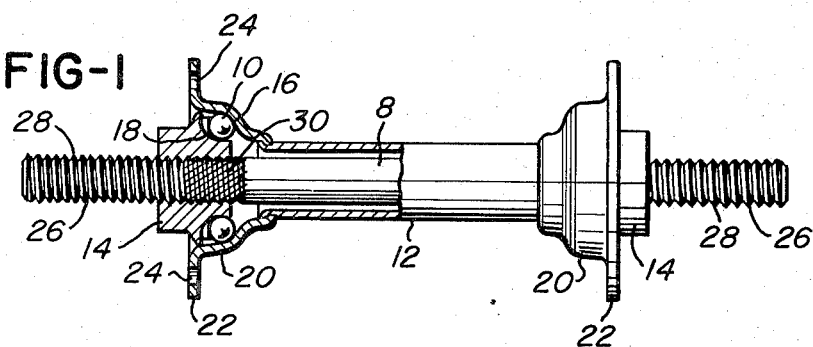
FIG. 1 is a side elevation partly in cross-section, showing an axle, hub, bearing and cone assembly incorporating the present invention.

In the drawing, a bicycle wheel axle 8 is shown supporting conventional anti-friction ball bearings 10 which in turn support the wheel hub 12. A cone member 14 internally screw-threaded, is applied to the axle for adjustably seating the bearing balls with proper force upon the inner race 16 of the hub. The cone member carries a complementary bearing race 18, as is customary. The bell 20 of the hub may be provided with an annular flange 22 apertured as at 24 to accommodate the inner ends of wheel spokes, not shown, used in constructing the wheel.

With respect to the anti-friction bearing balls 10, it should be understood that common practice is to confine the balls in an annular ball ring or holder, which need not be shown for the purposes of the present invention.

The axle 8 is longer than hub 12, and has opposite end portions 26, 26 provided with external screw threads 28 which are complementary to the internal screw threads of cone member 14. The axle threads may be formed on the axle by any acceptable method, as by rolling for example. The rolled threads usually loosely accommodate the cone member, for the benefit of speed and ease of assembly.

It will be understood of course, that the opposite ends of axle 8 are similarly threaded to accommodate identical cone members and bearings for support of the hub bells, wherefore a description of one axle end portion should suffice for the other also.

As depicted by FIG. 1, the cone member 14 has been rotatably advanced onto the axle end to a position of adjustment, at which the bearing balls 10 are properly embraced by ball races 16 and 18 for proper rotary support of the wheel hub. This position of the cone member may be referred to as the final position or zone of repose of the cone member upon the axle, and includes by preference the innermost convolutions of the axle threads.

Figure 2:
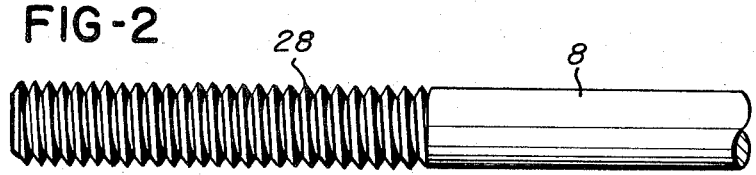
FIG. 2 is an enlarged elevation of a threaded axle end.
Figure 3:
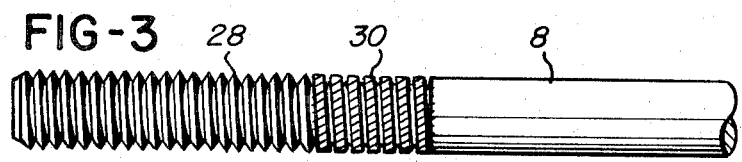
FIG. 3 is a view similar to FIG. 2, showing the axle thread modified in accordance with the present invention.

In the course of fabrication, the axle is threaded according to FIG. 2, and deformed at its innermost thread convolutions according to FIG. 3; that is, the deformation at the zone of repose 30 is directed upon the axle thread convolutions near the inner ends of the threads, so that the roots of the deformed thread convolutions remain substantially intact though the thread peaks and side faces become flattened and distorted by spreading. The deformation of the thread may be effected by means of a knurling die, which by preference may be incorporated in the thread rolling die used in forming the regular threads 28. It is important to note that the thread convolutions are continuous or uninterrupted along the entire threaded portion of the axle end, inclusive of the knurled or mutilated portion thereof.

Figure 4:
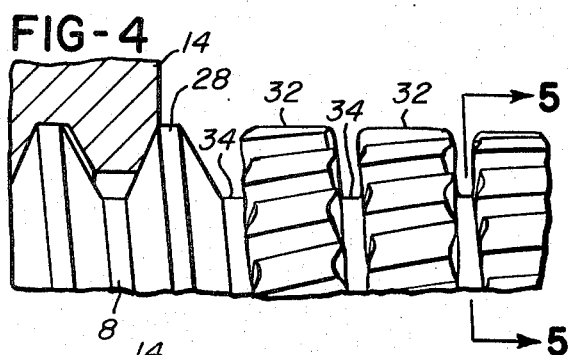
FIG. 4 is a greatly enlarged view of the axle thread modified by deformation, with a cone member advanced toward the deformed threads.
Figure 5:
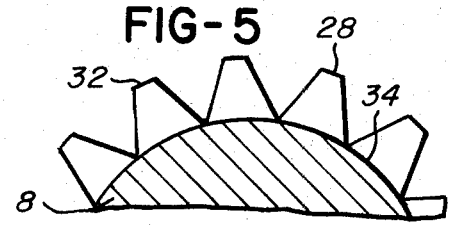
FIG. 5 is a cross-section taken on line 5—5 of FIG. 4.
Figure 6:
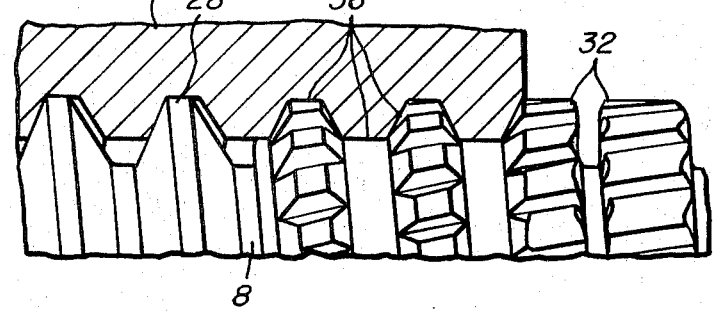
FIG. 6 is a view similar to FIG. 4, showing the cone member further advanced, to reform the deformed threads.

The knurling or deforming portion of the rolling die acts upon the innermost thread convolutions to flatten or mash the peaks of the threads and spread them to an abnormal width, as shown at 32 of FIGS. 4 and 5, without, however, much effect upon the roots 34 of the thread convolutions. Accordingly, a forced rotary advancement of the cone member 14 along the axle to the right, in FIG. 6, induces the cone member threads to follow the root path of the deformed thread convolutions, while reshaping and restoring the thread to a modified approximation of its original form. The modification, however, resides in a crowding, and therefore a binding, of displaced metal upon and between the internal thread convolutions of the cone member, as at 36 of FIG. 6. The crowding and binding that occurs at the reshaped thread convolutions is sufficient to effectively oppose any inclination of the cone member to move from an adjusted position relative to the axle.

In the light of the foregoing explanation, it should readily be evident that the pre-adjusted assembly of FIG. 1 can be produced by simply inserting the ball bearings into the hub bells, and then advancing the cone members toward the bells until they climb onto the deformed areas of the axle threads to a final position at which the bearing balls properly rest upon the races 16 and 18. The cone members have thereupon reached the final adjusted position of repose, at which they will remain unless by deliberate action a determined effort is advanced to effect a readjustment or removal of the cone members.

A definite advantage resulting from practice of the present invention, is that the cones may be repeatedly adjusted or removed from the axle if necessary, without depreciating to any practical degree the binding and holding power required to maintain a subsequent firm and proper bearing adjustment.

Treatment of the threaded portions of the axle as explained, will not increase the cost of manufacture since the knurling operation may be performed concurrently with rolling of the axle thread. The knurling or deforming of the axle thread near the inner terminus thereof may be performed as a separate operation if desired. In any event, the procedure disclosed herein produces a cone member lock which is superior to any heretofore proposed.

What is claimed is:

1. A wheel hub and axle assembly for a bicycle or the like, comprising: an elongate axle having opposite screw-threaded end portions, each said screw threaded end portion including a portion of continuous, uninterrupted thread at the outer end of the axle with an inner group of thread convolutions thereof mashed and deformed at the peaks thereof to define a selected zone of repose along an inner portion of the threaded axle end; an elongate tubular hub mounted coaxially upon the axle for relative rotation therebetween, said hub having opposite ends each provided with an annular bearing race; ball bearings in rolling contact with said bearing races; an internally threaded cone member rotational upon each threaded end portion of the axle for advancement to the selected zone of repose at which the cone member is in contact with the bearing balls and impresses said balls against a respective bearing race with a predetermined adjusted force of contact; threaded adjustment of said cone member into the selected zone of repose at least partially restoring and shaping said deformed thread convolutions to a fit with the internal threads of the cone member which is precise, tight and resilient within the limits of inherent resiliency of the axle material, for releasably locking the cone member upon the axle at said selected zone of repose, to maintain said bearing balls in properly adjusted relation.

2. The assembly as defined by claim 1, wherein mashing of the inner thread convolutions is limited so as to preserve substantially intact the root areas of the inner thread convolutions.

3. The assembly as defined by claim 2, wherein the mashed inner thread convolutions are knurled.

4. The assembly as defined by claim 1, wherein the axle thread convolutions including those within the zone of repose, are continuous as to the path constituted of the roots of all said convolutions.

5. The assembly as defined by claim 1, wherein the mashed inner thread convolutions of the zone of repose are widened and serrated at the peaks thereof.

6. The assembly as defined by claim 1, wherein the mashed inner thread convolutions of the zone of repose are widened and serrated at the peaks thereof, without obliteration of the root areas of the deformed convolutions.

7. The method of forming a bicycle wheel hub and axle assembly, said axle having opposite, threaded end portions and an intermediate portion, comprising: forming a screw thread on an end portion of the axle; deforming selected convolutions of the thread adjacent the intermediate portion of the axle by mashing the peaks of said selected convolutions while leaving the roots of the thread convolutions undisturbed; positioning an elongate, tubular hub coaxially upon the axle for relative rotation between the hub and the axle, said hub having opposite ends provided with bearing means; and threading an internally threaded cone member upon said threaded end portion of the axle into contact with the deformed convolutions at least partially restoring and shaping the deformed convolutions to a fit with the internal threads of the cone member which is precise, tight and resilient within the limits of inherent resiliency of the axle material, thus releasably locking the cone member upon the axle to maintain the bearing means in properly adjusted relation.

8. A bicycle wheel axle and cone assembly comprising: an elongate axle having opposite screw threaded end portions each including a first portion of continuous, uninterrupted thread convolutions at the outer end of the axle, and a second portion at the inner ends of said thread convolutions which are deformed and flattened at their peaks to define a selected zone of repose at the inner ends of the threaded end portions; an internally threaded cone member freely rotatable upon and engaging the outer, uninterrupted threaded convolutions of the axle and resisting initial threaded engagement with the deformed portion of said thread convolutions; said cone member when rotated upon the deformed portion of said convolutions at least partially restoring and shaping said convolutions to a fit with the internal threads of the cone member which is precise, tight and resilient within the limits of inherent resiliency of the axle material for releasably locking the cone upon the axle at said zone of repose.

* * * * *